US009697794B2

(12) United States Patent
Lee et al.

(10) Patent No.: US 9,697,794 B2
(45) Date of Patent: Jul. 4, 2017

(54) DISPLAY SYSTEM

(71) Applicant: Samsung Display Co., Ltd., Yongin, Gyeonggi-Do (KR)

(72) Inventors: Eunho Lee, Suwon-si (KR); Hyundae Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/688,653

(22) Filed: Apr. 16, 2015

(65) Prior Publication Data

US 2016/0148592 A1 May 26, 2016

(30) Foreign Application Priority Data

Nov. 26, 2014 (KR) ........................ 10-2014-0166654

(51) Int. Cl.
*G06F 13/14* (2006.01)
*G09G 5/00* (2006.01)

(52) U.S. Cl.
CPC ............. *G09G 5/006* (2013.01); *G09G 5/008* (2013.01); *G09G 2330/021* (2013.01); *G09G 2350/00* (2013.01)

(58) Field of Classification Search
CPC .................................. G06F 3/14; G09G 5/363
USPC .......................................................... 345/520
See application file for complete search history.

(56) References Cited

U.S. PATENT DOCUMENTS

2002/0005863 A1* 1/2002 Nagai .................... G09G 5/006 345/698
2007/0176919 A1* 8/2007 Yamashita ............. G09G 5/006 345/214
2013/0241859 A1* 9/2013 Saitoh ..................... G06F 3/041 345/173
2014/0168197 A1 6/2014 Kobayashi et al.
2014/0232940 A1* 8/2014 Nio .................. H04N 21/43635 348/723
2015/0194083 A1* 7/2015 Sinha ..................... G09G 3/007 345/212

FOREIGN PATENT DOCUMENTS

JP 2002-221952 A 8/2002
KR 10-2005-0031626 4/2005
KR 10-0671516 1/2007
KR 10-1301441 8/2013
KR 10-2014-0046092 4/2014

OTHER PUBLICATIONS http://www.pcpro.co.uk/reviews/tablets/389350/asus-memo-pad-7-me176cx; “Asus Memo Pad 7 ME176CX review”; (4 pgs); Jan. 22, 2015.

* cited by examiner

*Primary Examiner* — Jin Ge
(74) *Attorney, Agent, or Firm* — Innovation Counsel LLP

(57) ABSTRACT

A display system includes a plurality of transmitting lines configured to transmit a plurality of image signals and a display device configured to display an image based on the image signals applied thereto through the transmitting lines. At least one transmitting line of the transmitting lines is further configured to transmit the image signals at a bandwidth that is adjusted according to the information of the image signals.

11 Claims, 7 Drawing Sheets

DISPLAY SYSTEM

CROSS-REFERENCE TO RELATED APPLICATION

This U.S. non-provisional patent application claims priority under 35 U.S.C. §119 of Korean Patent Application No. 10-2014-0166654, filed on Nov. 26, 2014, the contents of which are hereby incorporated by reference.

BACKGROUND

1. Field of Disclosure

The present disclosure relates to a display system. More particularly, the present disclosure relates to a display system capable of reducing power consumption when a host interfaces with a display device.

2. Description of the Related Art

A display system generally includes a host outputting an image signal of each frame and control signals and a display device displaying an image. The display device includes a display panel to display the image and gate and data drivers to drive the display panel. The display panel includes gate lines, data lines, and pixels. Each of the pixels is connected to a corresponding gate line of the gate lines and a corresponding data line of the data lines. The gate lines receive gate signals from the gate driver. The data lines receive data voltages from the data driver. The pixels receive the data voltages through the data lines in response to the gate signals provided through the gate lines. The pixels display grayscales corresponding to the data voltages, and thus the image is displayed.

In recent years, as the market demand for high resolution continues to increase, the amount of data transmitted between the host and the display device also continues to increase. As a result, power consumption by the high-speed interfaces that provide data transmission between the host and the display device also continues to increase.

SUMMARY

The present disclosure provides a display system capable of reducing power consumption when a host interfaces with a display device.

Embodiments of the present system and method provide a display system including a plurality of transmitting lines configured to transmit a plurality of image signals and a display device configured to display an image based on the image signals provided from the transmitting lines. A bandwidth of at least one transmitting line of the transmitting lines is further configured to transmit the image signals at a bandwidth that is adjusted according to the information of the image signals.

At least one transmitting line of the transmitting lines may be further configured to be inactivated according to the information of the image signals.

The bandwidth of the transmitting line may be adjusted according to a frequency control.

The display system may further include a host configured to output the image signals. The host may include a host controller configured to output the image signals and a driving signal and a transmitter configured to receive the image signals and the driving signal and apply the image signals to the display device based on the driving signal.

The driving signal may include a main clock signal to adjust the bandwidth of the transmitting lines and a switching control signal to determine an activation state of the transmitting lines.

The driving signal may further include a plurality of control signals for controlling an operation of the display device, and the control signals are applied to the display device through the transmitting lines.

The transmitter may include a clock controller configured to generate a clock signal corresponding to a bandwidth of each transmitting line based on the main clock signal, a switching part configured to switch the clock signal in accordance with the switching control signal, and a signal transmitter configured to output the image signals in response to the clock signal provided from the switching part.

The clock controller may include one or more clock parts.

Each of the clock parts may be configured to adjust a frequency of the main clock signal to generate the clock signal corresponding to the bandwidth of each transmitting line.

The switching part may include a plurality of switches corresponding to a number of the transmitting lines.

Each of the switches may be configured to turn on in response to the switching control signal in an activation state.

The display device may include a receiver configured to receive the image signals through the transmitting lines.

The transmitting lines may include a first transmitting line and a second transmitting line, and the receiver may be configured to receive the image signals through the first transmitting line at a first bandwidth and the second transmitting line at a second bandwidth.

The transmitting lines may further include a third transmitting line configured to refrain from transmitting the image signals to the receiver when the third transmitting line is inactivated.

According to the above, the power consumption of the display system is reduced.

BRIEF DESCRIPTION OF THE DRAWINGS

The above and other advantages of the present disclosure are readily apparent when the following detailed description is considered in conjunction with the accompanying drawings wherein.

DETAILED DESCRIPTION

Figure 1:
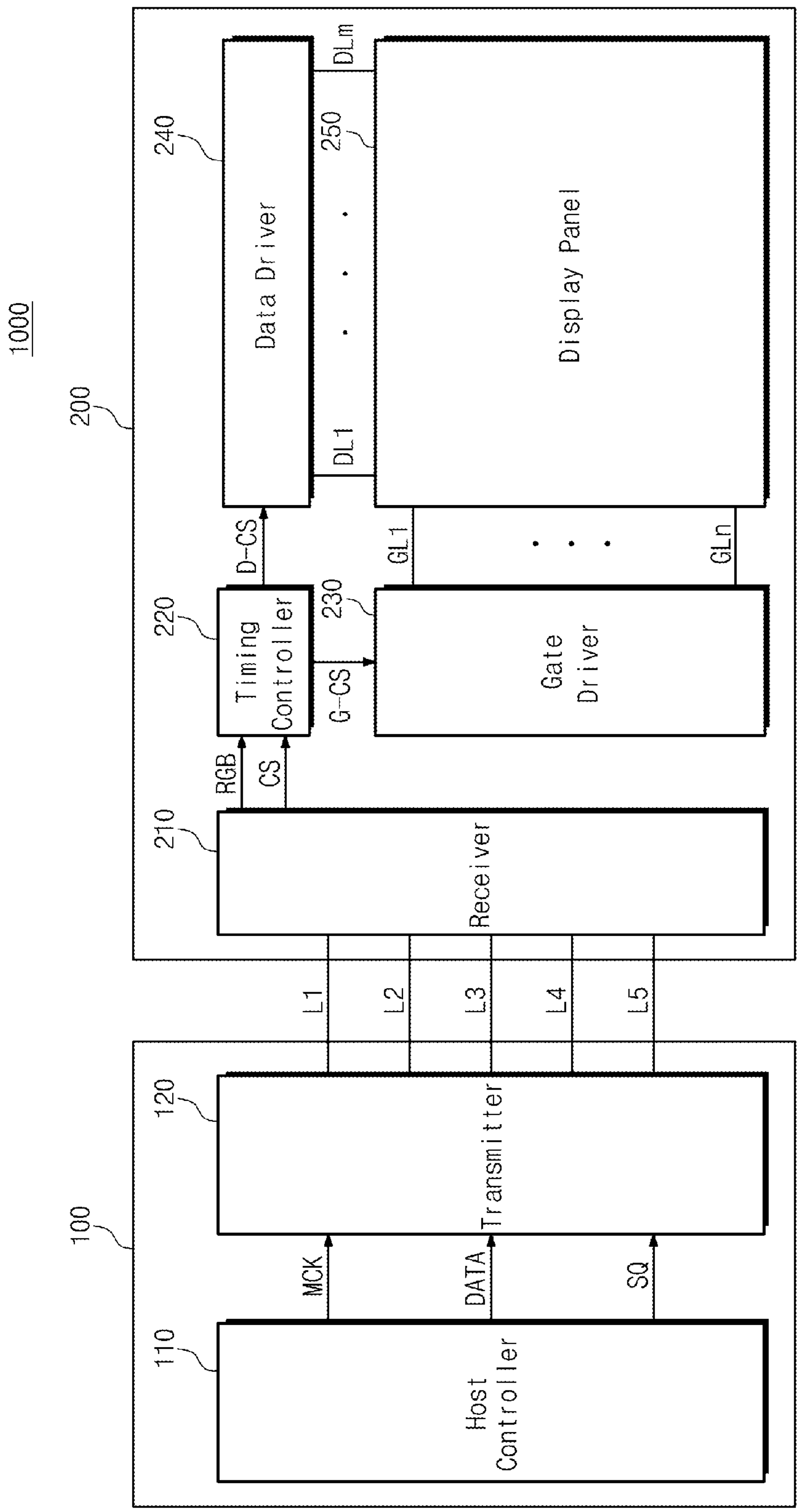
FIG. 1 is a block diagram showing a display system according to an exemplary embodiment of the present disclosure.

When an element or layer is referred to as being "on", "connected to" or "coupled to" another element or layer, it may be directly on, connected or coupled to the another element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections are not limited by these terms. These terms are only used to distinguish one element, component, region, layer or section from another region, layer or section. Thus, a first element, component, region, layer or section discussed below may also be referred to as a second element, component, region, layer or section without departing from the teachings of the present disclosure.

Spatially relative terms, such as "beneath", "below", "lower", "above", "upper" and the like, may be used herein to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" encompasses both an orientation of above and below, depending on the orientation of the device relative to that shown in the figures. Therefore, in whichever way the device may be otherwise oriented (e.g., rotated 90 degrees or at other orientations), the spatially relative descriptors used herein are to be interpreted accordingly.

The terminology used herein for describing particular embodiments is not limiting of the disclosure. As used herein, the singular forms, "a", "an" and "the" include the plural forms as well, unless the context clearly indicates otherwise. The terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the meaning as commonly understood by one of ordinary skill in the art to which this disclosure belongs. That is, terms, including those defined in commonly used dictionaries, have a meaning that is consistent with their meaning in the context of the relevant art unless expressly so defined herein.

Hereinafter, the present disclosure is explained in detail with reference to the accompanying drawings.

FIG. 1 is a block diagram showing a display system 1000 according to an exemplary embodiment of the present disclosure. Referring to FIG. 1, the display system 1000 includes a host 100 and a display device 200.

The host 100 includes a host controller 110 controlling an overall operation of the host 100 and a transmitter 120 transmitting each signal provided from the host controller 110 to the display device 200.

The host controller 110 generates a main clock signal MCK, data DATA, and a switching control signal SQ. The main clock signal MCK and the switching control signal SQ may be driving signals for operating an interface between the transmitter 120 and a receiver 210 of the display device 200. The driving signals may further include a plurality of control signals controlling an operation of the display device 200.

The host controller 110 may control an operation of the transmitter 120. In detail, the transmitter 120 receives the main clock signal MCK, the data DATA, and the switching control signal SQ from the host controller 110. The transmitter 120 converts the data DATA in analog form into image signals RGB in digital form and outputs the converted image signals RGB based on the main clock signal MCK.

In addition, the transmitter 120 transmits the image signals RGB to the receiver 210 through a plurality of transmitting lines L1 to L5. That is, signals are transmitted through the transmitting lines L1 to L5 during the interface between the transmitter 120 and the receiver 210.

Although the exemplary embodiment of FIG. 1 shows five transmitting lines L1 to L5, the number of the transmitting lines is not limited to five. That is, any number of transmitting lines (e.g., five or more transmitting lines) may be used for the interface between the transmitter 120 and the receiver 210.

According to the exemplary embodiment of FIG. 1, the transmitter 120 transmits the signal using at least one transmitting line of the transmitting lines L1 to L5 in response to the switching control signal SQ. Particularly, the transmitter 120 may transmit the signal by using only a subset of the transmitting lines L1 to L5 depending on image information displayed on a display panel 250.

For instance, when a still image is displayed on the display panel 250, the transmitter 120 transmits the signal by using a portion of the transmitting lines instead of using all the transmitting lines L1 to L5. A still image is generally a specific image that is continuously displayed during a predetermined time period greater than a reference time period. The host controller 110 generates the switching control signal SQ based on the image information. Although the case of using only a subset of the transmitting lines is described with reference to displaying a still image, it is not limited thereto or thereby.

According to the exemplary embodiment of FIG. 1, the transmitter 120 controls a bandwidth of each transmitting line based on the main clock signal MCK. In detail, the transmitter 120 controls a frequency of the main clock signal MCK to adjust the bandwidth of each transmitting line.

That is, the interface between the transmitter 120 and the receiver 210 is controlled according to the image information displayed on the display panel 250. Therefore, the power consumption generated during the interface between the transmitter 120 and the receiver 210 is reduced. Further details on power consumption reduction are described below with reference to FIGS. 3 and 4.

Referring back to FIG. 1, the display device 200 includes the receiver 210, a timing controller 220, a gate driver 230, a data driver 240, and the display panel 250.

The receiver 210 receives the digital image signals RGB and the control signals CS from the transmitter 120 through the transmitting lines L1 to L5. The receiver 210 applies the digital image signals RGB and the control signals CS to the timing controller 220.

The timing controller 220 receives the digital image signals RGB and the control signals CS from the receiver 210. The timing controller 220 converts the data format of the image signals RGB to a data format appropriate to the interface between the data driver 240 and the timing controller 220. The timing controller 220 applies the converted image signals R'G'B' to the data driver 240.

The timing controller 220 outputs a plurality of driving signals in response to the control signals CS. The timing controller 220 generates a data control signal D-CS and a gate control signal G-CS as the driving signals. The data control signal D-CS may include an output start signal and a horizontal start signal. The gate control signal G-CS may include a vertical start signal and a vertical clock bar signal. The timing controller 220 applies the data control signal D-CS to the data driver 240 and applies the gate control signal G-CS to the gate driver 230.

The gate driver 230 generates a plurality of gate signals in response to the gate control signal G-CS from the timing controller 220. The gate driver 230 sequentially outputs the gate signals to the display panel 250 through gate lines GL1 to GLn. Pixels PX11 to PXnm included in the display panel 250 are sequentially scanned by the gate signal in the unit of row.

The data driver 240 converts the image signals R'G'B' to data voltages in response to the data control signal D-CS from the timing controller 220. The data driver 240 outputs the data voltages to the display panel 250 through data lines DL1 to DLm.

The display panel 250 includes the gate lines GL1 to GLn, the data lines DL1 to DLm, and the pixels PX11 to PXnm.

The gate lines GL1 to GLn extend in a row direction to cross the data lines DL1 to DLm extending in a column direction. The gate lines GL1 to GLn are electrically connected to the gate driver 230 and receive the gate signals. The data lines DL1 to DLm are electrically connected to the data driver 240 and receive the data voltages. Each of the pixels PX11 to PXnm is connected to a corresponding gate line of the gate lines GL1 to GLn and a corresponding data line of the data lines DL1 to DLm.

Figure 2:
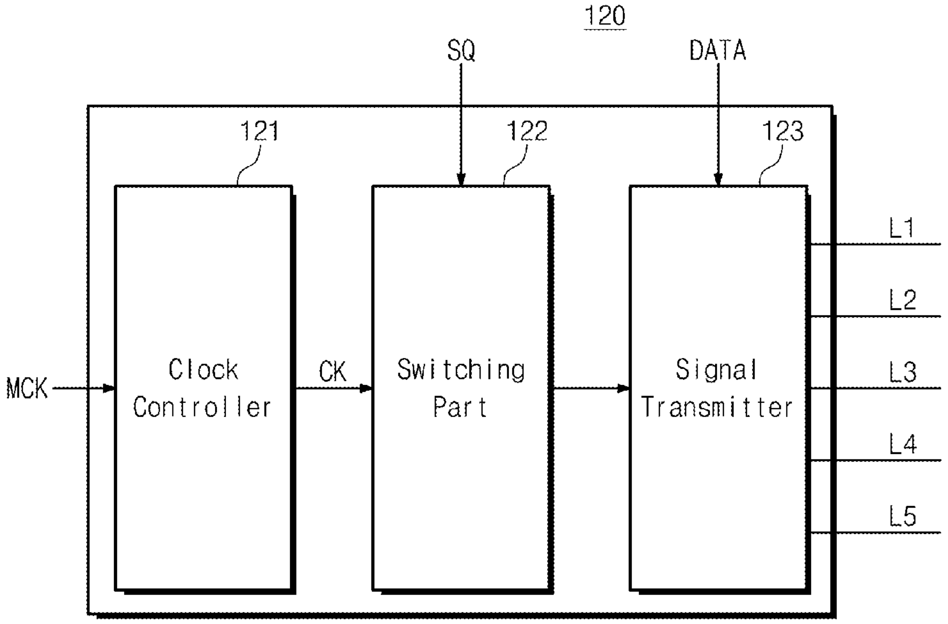
FIG. 2 is a block diagram showing a transmitter shown in FIG. 1.
Figure 3:
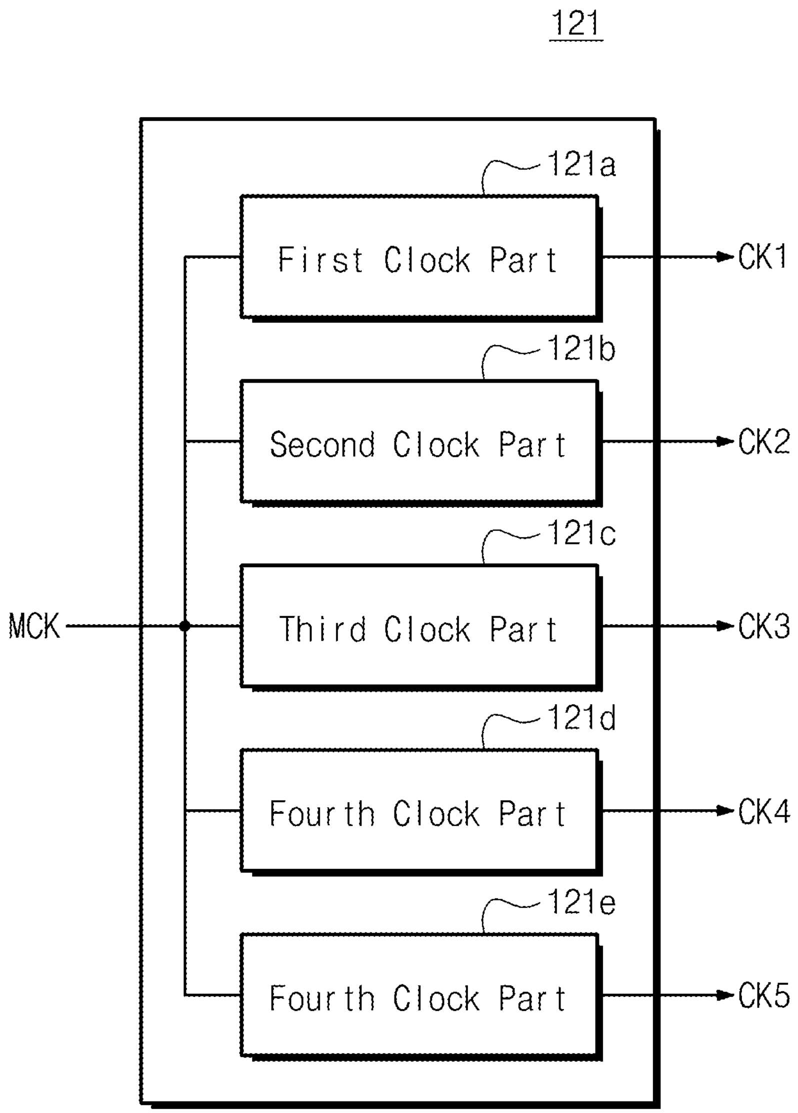
FIG. 3 is a block diagram showing a clock controller shown in FIG. 2.
Figure 4:
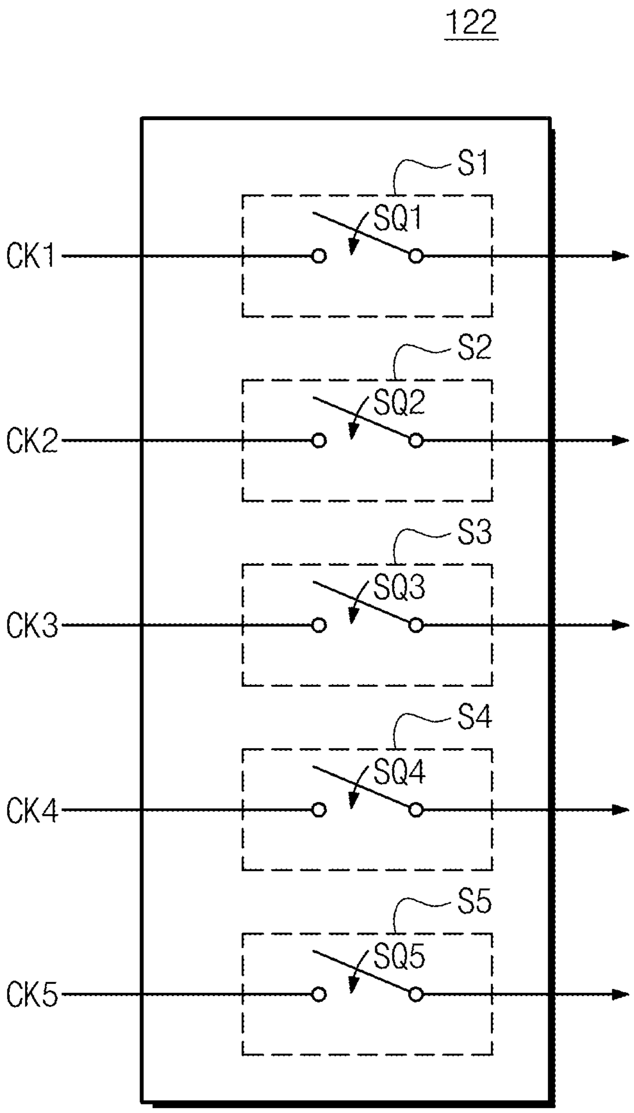
FIG. 4 is a block diagram showing a switching part shown in FIG. 2.
Figure 5:
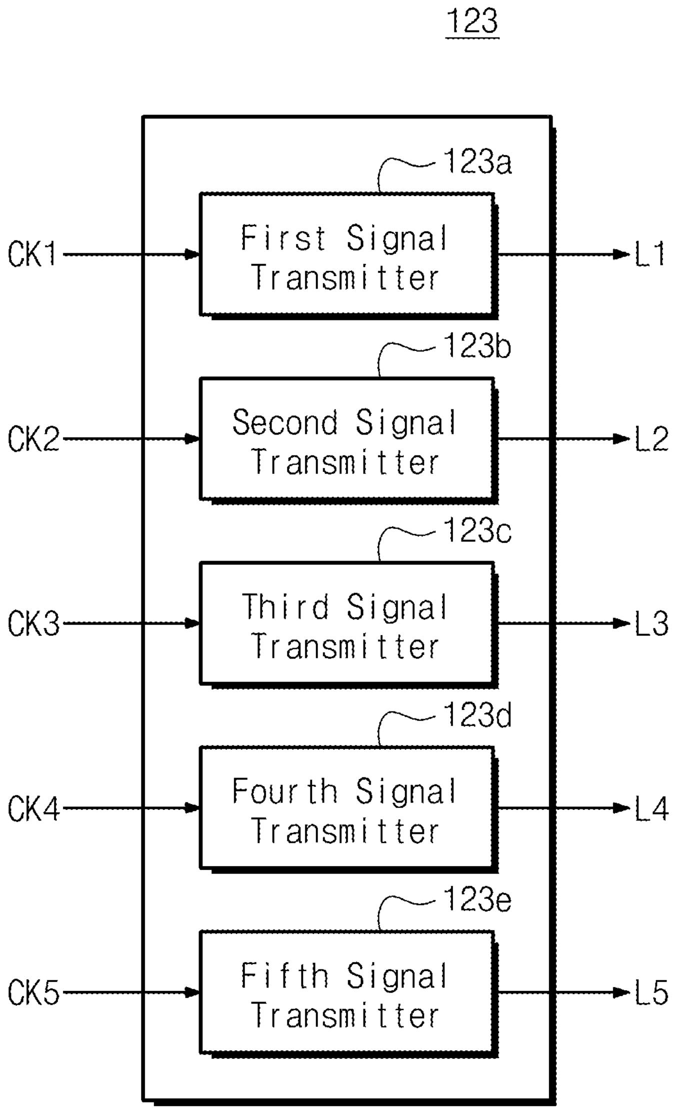
FIG. 5 is a block diagram showing a signal transmitter shown in FIG. 2.

FIG. 2 is a block diagram showing the transmitter shown in FIG. 1. FIG. 3 is a block diagram showing a clock controller shown in FIG. 2. FIG. 4 is a block diagram showing a switching part shown in FIG. 2. FIG. 5 is a block diagram showing a signal transmitter shown in FIG. 2.

Referring to FIG. 2, the transmitter 120 includes a clock controller 121, a switching part 122, and a signal transmitter 123.

The clock controller 121 receives the main clock signal MCK output from the host controller 110 (refer to FIG. 1). The clock controller 121 generates a plurality of clock signals CK based on the main clock signal MCK.

In detail, referring to FIG. 3, the clock controller 121 includes first, second, third, fourth, and fifth clock parts 121*a*, 121*b*, 121*c*, 121*d*, and 121*e* that determine a bandwidth of the transmitting lines L1 to L5. Each clock part receives the main clock signal MCK and generates therefrom a clock signal CK whose frequency depends on the image information. Each clock signal CK corresponds to and is used to adjust the bandwidth of each transmitting line. Although not shown in figures, the host controller 110 may apply a frequency control signal to the clock controller 121 such that each clock part controls the frequency of the main clock signal MCK.

The first clock part 121*a* generates a first clock signal CK1 based on the main clock signal MCK to control a bandwidth of the first transmitting line L1. The second clock part 121*b* generates a second clock signal CK2 based on the main clock signal MCK to control a bandwidth of the second transmitting line L2. The third clock part 121*c* generates a third clock signal CK3 based on the main clock signal MCK to control a bandwidth of the third transmitting line L3. The fourth clock part 121*d* generates a fourth clock signal CK4 based on the main clock signal MCK to control a bandwidth of the fourth transmitting line L4. The fifth clock part 121*e* generates a fifth clock signal CK5 based on the main clock signal MCK to control a bandwidth of the fifth transmitting line L5.

As described above, the clock controller 121 generates the clock signals CK from the main clock signal MCK, and the frequency of each clock signal CK is used to control the bandwidth of each corresponding transmitting line. Moreover, the frequency of each clock signal CK, and therefore the bandwidth of each corresponding transmitting line, is determined based on the image information. For instance, when a still image is displayed on the display panel, at least one of the first to fifth clock parts 121*a* to 121*e* may output a clock signal having a reduced frequency to reduce the bandwidth of the corresponding transmitting line, thereby reducing power consumption. The first to fifth clock parts 121*a* to 121*e* may be controlled by an external control.

Although the clock controller 121 of the above-described embodiment outputs the clock signal controlling the bandwidth of each transmitting line based on the main clock signal MCK, it is not limited thereto or thereby. The clock controller 121 may output the main clock signal MCK so that the bandwidth of the transmitting line is not adjusted.

Although the clock controller 121 of FIG. 3 includes five clock parts respectively corresponding to the transmitting lines, it is not limited thereto or thereby. The clock controller 121 may include any number of clock parts to control the bandwidth of the transmitting lines.

The switching part 122 receives the switching control signal SQ from the host controller 110. The switching part 122 may determine whether each clock signal is output to the corresponding transmitting line in response to the switching control signal SQ.

In detail, referring to FIG. 4, the switching part 122 includes first, second, third, fourth, and fifth switches S1 to S5. The first switch S1 receives the first clock signal CK1 from the first clock part 121*a* through its input terminal Depending on the activation state of a first switching control signal SQ1, the first switch S1 may or may not output the first clock signal CK1 through its output terminal. The activated first switching control signal SQ1 may be a signal to turn-on the first switch S1, in which case, the first clock signal CK1 may be outputted by the first switch S1.

The second switch S2 receives the second clock signal CK2 from the second clock part 121*b* through its input terminal. Depending on an activation state of a second switching control signal SQ2, the second switch S2 may or may not output the second clock signal CK2 through its output terminal. The activated second switching control signal SQ2 may be a signal to turn-on the second switch S2, in which case, the second clock signal CK2 may be outputted by the second switch S2.

The third switch S3 receives the third clock signal CK3 from the third clock part 121*c* through its input terminal Depending on an activation state of a third switching control signal SQ3, the third switch S3 may or may not output the third clock signal CK3 through its output terminal. The activated third switching control signal SQ3 may be a signal to turn-on the third switch S3, in which case, the third clock signal CK3 may be outputted by the third switch S3.

The fourth switch S4 receives the fourth clock signal CK4 from the fourth clock part 121*d* through its input terminal. Depending on an activation state of a fourth switching control signal SQ4, the fourth switch S4 may or may not output the fourth clock signal CK4 through its output terminal. The activated fourth switching control signal SQ4 may be a signal to turn-on the fourth switch S4, in which case, the fourth clock signal CK4 may be outputted by the fourth switch S4.

The fifth switch S5 receives the fifth clock signal CK5 from the fifth clock part 121*e* through its input terminal.

Depending on an activation state of a fifth switching control signal SQ5, the fifth switch S5 may or may not output the fifth clock signal CK5 through its output terminal. The activated fifth switching control signal SQ5 may be a signal to turn-on the fifth switch S5, in which case, the fifth clock signal CK5 may be outputted by the fifth switch S5.

Each clock signal CK output from the switching part 122 is applied to the signal transmitter 123.

As described earlier, the clock controller 121 may include any number of clock parts to control the bandwidth of the transmitting lines. For instance, the clock controller 121 may include two clock parts to adjust the bandwidth of two transmitting lines. In such case, two switches in the switching part 122 may receive the clock signals used to control the bandwidth, while other switches in the switching part 122 may receive the main clock signal output from the host controller 110.

In addition, the host controller 110 may generate the switching control signals SQ1 to SQ5 to turn on one or more of the switches S1 to S5. For instance, during the interface between the transmitter 110 and the receiver 210, the clock signals CK1, CK2, and CK3 may be transmitted through the first, second, and third transmitting lines L1, L2, and L3, respectively, of the transmitting lines L1 to L5 while the clock signals CK4 and CK5 are not transmitted. In such case, the host controller 110 outputs the first, second, and third switching control signals SQ1, SQ2, and SQ3 in an activation state and outputs the fourth and fifth switching control signals SQ4 and SQ5 in an inactivation state.

As the first, second, and third switching control signals SQ1, SQ2, and SQ3 are activated, the first, second, and third clock signals CK1, CK2, and CK3 are output to the signal transmitter 123 through the first, second, and third switches S1, S2, and S3. On the contrary, as the fourth and fifth switching control signals SQ4 and SQ5 are inactivated, the fourth and fifth clock signals CK4 and CK4 are not output through the fourth and fifth switches S4 and S5.

The signal transmitter 123 receives the data DATA from the host controller 110. The signal transmitter 123 converts the data DATA into the digital image signals RGB. The signal transmitter 123 outputs the digital image signals RGB through the first to fifth transmitting lines L1 to L5 in response to the first to fifth clock signals CK1 to CK5 output from the switching part 122.

In detail, referring to FIG. 5, the signal transmitter 123 includes first, second, third, fourth, and fifth signal transmitters 123*a* to 123*e*. The first signal transmitter 123*a* is connected to the output terminal of the first switch S1 and receives the first clock signal CK1 when the first switch S1 is activated. The first signal transmitter 123*a* outputs corresponding digital image signals RGB through the first transmitting line L1 in response to the first clock signal CK1.

The second signal transmitter 123*b* is connected to the output terminal of the second switch S2 and receives the second clock signal CK2 when the second switch S2 is activated. The second signal transmitter 123*b* outputs corresponding digital image signals RGB through the second transmitting line L2 in response to the second clock signal CK2.

The third signal transmitter 123*c* is connected to the output terminal of the third switch S3 and receives the third clock signal CK3 when the third switch S3 is activated. The third signal transmitter 123*c* outputs corresponding digital image signals RGB through the third transmitting line L3 in response to the third clock signal CK3.

The fourth signal transmitter 123*d* is connected to the output terminal of the fourth switch S4 and receives the fourth clock signal CK4 when the fourth switch S4 is activated. The fourth signal transmitter 123*d* outputs corresponding digital image signals RGB through the fourth transmitting line L4 in response to the fourth clock signal CK4.

The fifth signal transmitter 123*e* is connected to output terminal of the fifth switch S5 and receives the fifth clock signal CK5 when the fifth switch S5 is activated. The fifth signal transmitter 123*e* outputs corresponding digital image signals RGB through the fifth transmitting line L5 in response to the fifth clock signal CK5.

Although the digital image signals RGB are output through the first to fifth signal transmitters 123*a* to 123*e* of the above-described embodiment, but they are not limited thereto or thereby. For example, one or more of the first to fifth signal transmitters 123*a* to 123*e* may output the control signals CS to control the operation of the display device 200. The control signals CS may be included in the data DATA or may be provided from the host controller 110.

In addition, if a signal transmitter does not receive a clock signal, the signal transmitter does not output the digital image signals RGB. In such case, it may be that the inactivated switching control signal is applied to the switch connected to the signal transmitter, and as such, the clock signal is not applied.

As described above, the display system 1000 according to the present disclosure may use only a subset of the transmitting lines instead of using all the transmitting lines during the interface between the host 100 and the display device 200. Also, the display system 1000 controls the bandwidth of each transmitting line during the interface between the host 100 and the display device 200. As a result, the power consumption during the interface between the host 100 and the display device 200 is reduced overall in the display system 1000.

Figure 6:
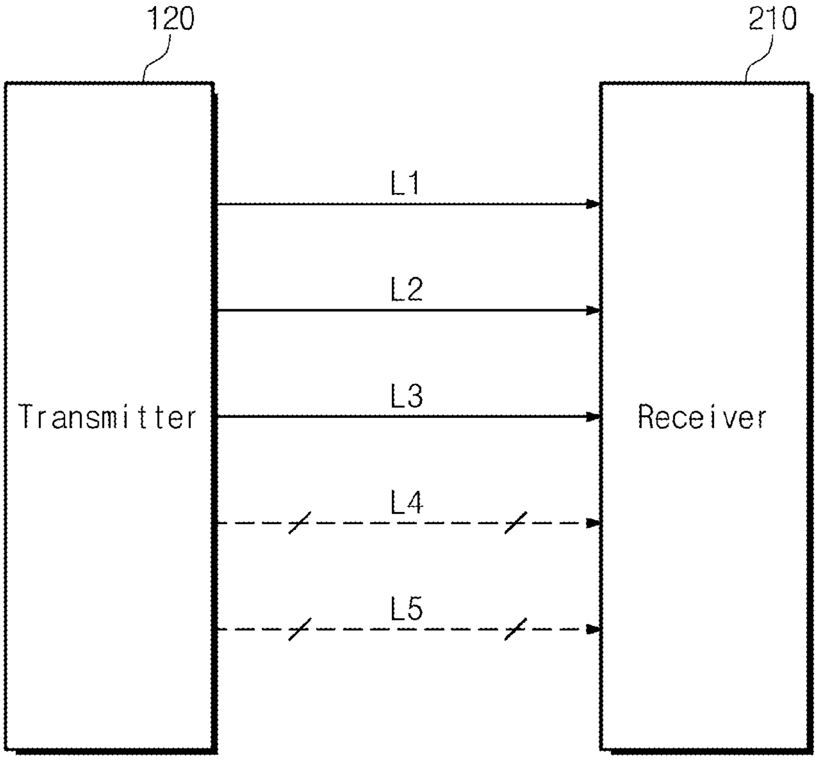
FIG. 6 is a block diagram showing an interface between the transmitter and a receiver according to an exemplary embodiment of the present disclosure.

FIG. 6 is a block diagram showing the interface between the transmitter and the receiver according to an exemplary embodiment of the present disclosure. Referring to FIGS. 2 to 6, the first, second, and third transmitting lines L1, L2, and L3 are activated and the fourth and fifth transmitting lines L4 and L5 are inactivated during the interface between the transmitter 120 and the receiver 210. That is, the transmitter 120 applies the digital image signals and the control signals to the receiver 210 through the first, second, and third transmitting lines L1, L2, and L3.

In detail, the host controller 110 applies the inactivated switching control signal SQ to the fourth and fifth switches S4 and S5. Since the fourth and fifth switches S4 and S5 are inactivated, the clock signal corresponding to the fourth and fifth signal transmitters 123*d* and 123*e* are not applied to the receiver 210. Therefore, the digital image signals are output only through the first, second, and third signal transmitters 123*a*, 123*b*, and 123*c*.

Here, the first, second, and third signal transmitters 123*a*, 123*b*, and 123*c* transmit the digital image signals RGB to the receiver 210 at their maximum bandwidth. That is, the first, second, and third signal transmitters 123*a*, 123*b*, and 123*c* output the digital image signals RGB based on the frequency of the main clock signal MCK.

Figure 7:
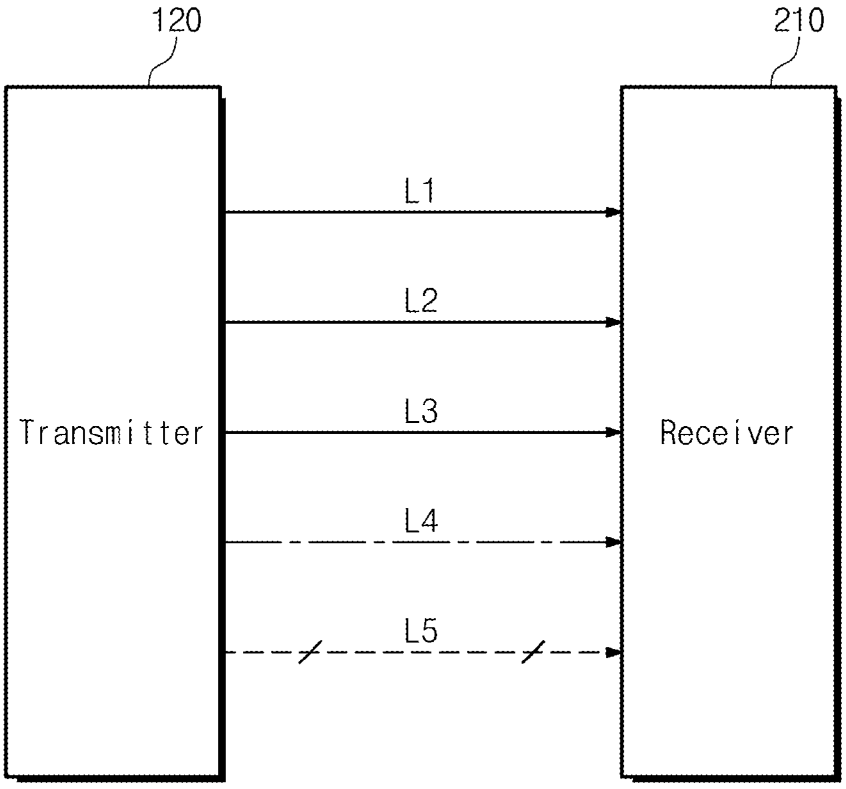
FIG. 7 is a block diagram showing an interface between a transmitter and a receiver according to another exemplary embodiment of the present disclosure.

FIG. 7 is a block diagram showing an interface between a transmitter and a receiver according to another exemplary embodiment of the present disclosure. Referring to FIGS. 2 to 7, first to fourth transmitting lines L1 to L4 are activated and a fifth transmitting line L5 is inactivated during an interface between a transmitter 120 and a receiver 210. The transmitter 120 applies digital image signals and control signals to the receiver 210 through the first to fourth transmitting lines L1 to L4.

In detail, first, second, and third signal transmitters 123*a*, 123*b*, and 123*c* apply the digital image signals RGB to the receiver 210 at their maximum bandwidth, while a fourth signal transmitter 123*d* outputs the digital image signals RGB at an adjusted bandwidth rather than its maximum bandwidth. In this case, a fourth clock part 121*d* applies a fourth clock signal CK4 having a lower frequency than that of the main clock signal MCK to the transmitter 123*d*. As a result of the lower clock frequency, the fourth signal transmitter 123*d* outputs the digital image signals RGB to the receiver 210 at the adjusted bandwidth.

Although exemplary embodiments of the present disclosure are described herein, the present disclosure is not limited to these exemplary embodiments. Rather, various changes and modifications can be made by one of ordinary skill in the art without departing from the spirit and scope of the present disclosure.

What is claimed is:

1. A display system comprising:

a host comprising a transmitter configured to receive a plurality of image signals and a driving signal and output the image signals based on the driving signal;

a plurality of transmitting lines configured to transmit the plurality of image signals; and a display device configured to display an image based on the image signals provided from the transmitting lines, wherein at least one transmitting line of the transmitting lines is configured to transmit the image signals at a bandwidth that is adjusted according to an information of the image signals, wherein the driving signal comprises:

a main clock signal to adjust the bandwidth of the transmitting lines; and a switching control signal to determine an activation state of the transmitting lines, and wherein the transmitter comprises:

a clock controller configured to generate a clock signal corresponding to a bandwidth of each transmitting line based on the main clock signal;

a switching part comprising a plurality of switches corresponding to the number of the transmitting lines and configured to switch the clock signal in accordance with the switching control signal; and a signal transmitter configured to output the image signals in response to the clock signal provided from the switching part, wherein one terminal of each of the switches is connected to an output terminal of the clock controller for receiving the clock signal and end terminal of each of the switches is connected to an input terminal of the signal transmitter for outputting the clock signal.

2. The display system of claim 1, wherein at least one transmitting line of the transmitting lines is further configured to be inactivated according to the information of the image signals.

3. The display system of claim 1, wherein the bandwidth of the transmitting line is adjusted according to a frequency control.

4. The display system of claim 1, wherein the host further comprises:

a host controller configured to output the image signals and the driving signal.

5. The display system of claim 1, wherein the driving signal further comprises a plurality of control signals for controlling an operation of the display device, and the control signals are applied to the display device through the transmitting lines.

6. The display system of claim 1, wherein the clock controller comprises one or more clock parts.

7. The display system of claim 6, wherein each of the clock parts is configured to adjust a frequency of the main clock signal to generate the clock signal corresponding to the bandwidth of each transmitting line.

8. The display system of claim 1, wherein each of the switches is configured to turn on in response to the switching control signal in an activation state.

9. The display system of claim 1, wherein the display device comprises a receiver configured to receive the image signals through one or more of the transmitting lines, wherein the transmitting lines is connected to between only one transmitter and only one receiver.

10. The display system of claim 9, wherein the transmitting lines comprise a first transmitting line and a second transmitting line, and the receiver is configured to receive the image signals through the first transmitting line at a first bandwidth and the second transmitting line at a second bandwidth.

11. The display system of claim 10, wherein the transmitting lines further comprise a third transmitting line configured to refrain from transmitting the image signals to the receiver when the third transmitting line is inactivated.

* * * * *